United States Patent [19]

Barks

[11] Patent Number: 4,708,195

[45] Date of Patent: Nov. 24, 1987

[54] METHOD OF SEALING LEAKS IN A COOLING SYSTEM

[76] Inventor: Robert W. Barks, Middletown Trace Apt. F65, Middletown, Del. 19709

[21] Appl. No.: 909,270

[22] Filed: Sep. 19, 1986

[51] Int. Cl.$^4$ ............................................... C09K 3/12
[52] U.S. Cl. ............................................ 165/1; 252/72; 106/33
[58] Field of Search ................. 252/72; 106/33; 165/1

[56] References Cited

U.S. PATENT DOCUMENTS

| | | | |
|---|---|---|---|
| Re. 15,971 | 12/1924 | Shrum | 252/72 |
| 1,630,828 | 5/1927 | Campbell | 252/72 |
| 1,715,337 | 5/1929 | Coughlin | 252/72 |
| 1,746,028 | 2/1930 | Churchill | 252/72 |
| 1,853,341 | 4/1932 | Djidich | 252/72 |
| 1,868,195 | 7/1932 | Cumming et al. | 252/72 |
| 1,891,506 | 12/1932 | Sommers et al. | 252/72 |
| 1,988,764 | 1/1935 | Winning et al. | 252/72 |
| 2,147,409 | 2/1939 | Lamprey | 252/72 |
| 2,241,963 | 5/1941 | Rosenthal | 252/72 |
| 2,885,296 | 5/1959 | Welden | 106/33 |

*Primary Examiner*—Albert W. Davis, Jr.
*Attorney, Agent, or Firm*—Roberts & Floyd

[57] ABSTRACT

The cooling system of automotive and other engines are permanently sealed by a cooling system sealant which will seal both small leaks caused by corrosion and large leaks caused by warped heads and blown head gaskets. The cooling system sealant comprises a major part of sodium silicate and minor parts of blue vitroil and gum of arabic. The cooling system sealant is added to the engine while running and with the coolant warmed.

1 Claim, No Drawings

METHOD OF SEALING LEAKS IN A COOLING SYSTEM

CROSS-REFERENCE TO RELATED APPLICATION

This invention is not disclosed in any co-pending application for the patent or any issued patent.

BACKGROUND OF THE INVENTION

The modern automotive engine may lose its coolant by any one of several means. It may have a blown head gasket, a warped head, a cracked block, a leaking freeze plug, a heating core leak, a radiator leak or a lost pet cock.

The engine will overheat rapidly as the coolant disappears. Additionally, coolant within the crankcase leads to rapid corrosion and coolant within a cylinder prevents ignition. For all of these reasons, coolant leaks must be repaired.

Correcting these sources of leaks may be quite expensive, including the removal of the engine. Serious leaks are often so expensive to repair that an entirely new engine or new radiator is required.

For many years cooling system sealants have been marketed with the objective of stopping the leak without incurring the substantial expense of automotive repairs.

At the present time, the following products are on the market: Wynn's "Radiator Stop Leak", K & W "Permanent Metallic Block Seal", "Bar's Leaks" (Extra Strength), Prestone "Heavy Duty Sealer and Stop Leak" and Dupont "#7 Formula Stop Leak" (Bordons).

Many of the prior art products are designed for temporary purposes. They will work for a few hours or days to enable a car to return home from a trip. These products rely upon solid particles to enter small holes or cracks and block the passageway.

In time, the solid particle may break down, thus allowing coolant to pass through the hole. The sealant may also plug up the small tubes in the radiator, thus reducing its effectiveness.

SUMMARY OF THE INVENTION

The cooling system of automotive and other engines are permanently sealed by a cooling system sealant which will seal both small leaks caused by corrosion and large leaks caused by warped heads and blown head gaskets. The cooling system sealant comprises a major part of sodium silicate and minor parts of blue vitroil and gum of arabic. The cooling system sealant is added to the engine while running and with the coolant warmed.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

DESCRIPTION OF THE PREFERRED EMBODIMENTS

The cooling system sealant used in this invention comprises three widely available ingredients, sodium silicate, blue vitroil and gum of arabic preferably mixed in an aqueous solution.

The first ingredient, sodium silicate or water glass may be pure sodium metasilicate or mixtures of sodium metasilicate with two other silicates. It is available as granular, crystals or 40% Baume solution. The N Grade liquid is preferred.

The second ingredient, blue vitroil or cupric sulfate pentahydrate, is available as crystals. It is used presently as a fungicide, in printing, as an electrolyte and ubiquitously in swimming pools.

The third ingredient, gum of arabic, a product of the tropical acacia senegal tree is one of the many related gums which are complexes of carbohydrates and which are the decomposition products of many plants. The gum of arabic is available as a powder.

The cooling system sealant is prepared in two steps. In the first step, the blue vitroil and gum of arabic are mixed. In the second step, the blue vitroil and gum of arabic mixture are mixed with the sodium silicate.

In the first step, one teaspoon (tsp.) of gum of arabic and one tablespoon (Tble.) of blue vitroil is mixed with one gallon of water. This produces an initial aqueous mixture of 0.39% blue vitroil and 0.13% gum of arabic.

In the second step, one gallon of sodium silicate is mixed with one-third of one pint of the initial aqueous solution. This produces a final mixture of 95.8% sodium silicate, 4.1% water, 0.16% blue vitroil and 0.005% gum of arabic.

This final mixture is then bottled in pint bottles. One pint of this final mixture is added to the cooling system of a car.

The cooling system of a modern car has 10 to 20 quart coolant capacity. The mixture within the cooling system is therefore from 2.5 to 5% sodium silicate, from 0.004 to 0.008% blue vitroil, and from 0.001 to 0.003% gum of arabic.

The engine should be started and warm before the cooling system sealant is added. The radiator cap is then removed and one pint of cooling system sealant is added. The engine continues to run until the leak is sealed.

In many cases, leaks can be detected when the engine is running. Visible vapor may come from the exhaust. A warped head or broken block may allow coolant to leave the block in a visible stream or drops. Sealing takes about ten minutes and may usually be visibly confirmed by the absence of the vapor or liquid previously noticed.

After the leaking stops, the engine should be stopped and allowed to cool. The sealant has now formed a permanent barrier and the leak is cured.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having disclosed my invention as required by law in such full, clear, concise and exact terms, including setting for the best mode contemplated, what is claimed is:

1. The method of sealing leaks in the coolant system of internal combustion engines which comprises:
   (a) operating the engine with the coolant at an elevated temperature,
   (b) adding to the coolant a mixture comprising, sodium silicate in a range of 2.5% to 5% of the coolant, blue vitroil in a range of 0.004% to 0.008 % of the coolant and gum of arabic in a range of 0.001% to 0.003% of the coolant,
   (c) continuing the operation of the engine until the leak is sealed,
   (d) stopping the engine to reduce the temperature of the coolant to the ambient.

* * * * *